United States Patent
Nakamura et al.

(10) Patent No.: US 7,216,416 B2
(45) Date of Patent: May 15, 2007

(54) COMPOUND PROCESSING SYSTEM FOR SHEET METAL PROCESSING

(75) Inventors: Kaoru Nakamura, Isehara (JP); Hideki Fujiwara, Isehara (JP)

(73) Assignee: Amada Company, Limited, Kanagawa (JP)

( * ) Notice: Subject to any disclaimer, the term of this patent is extended or adjusted under 35 U.S.C. 154(b) by 15 days.

(21) Appl. No.: 10/493,318

(22) PCT Filed: Nov. 8, 2002

(86) PCT No.: PCT/JP02/11688

§ 371 (c)(1),
(2), (4) Date: May 5, 2004

(87) PCT Pub. No.: WO03/040841

PCT Pub. Date: May 15, 2003

(65) Prior Publication Data

US 2004/0237284 A1    Dec. 2, 2004

(30) Foreign Application Priority Data

Nov. 9, 2001 (JP) ............................. 2001-345312

(51) Int. Cl.
*B23P 23/00* (2006.01)
*G06F 19/00* (2006.01)

(52) U.S. Cl. .................... 29/564; 29/33 R; 700/99; 700/103

(58) Field of Classification Search ................ 29/34 R, 29/564, 563, 33 P; 700/97, 165, 9, 104, 700/200, 99, 103; 72/324
See application file for complete search history.

(56) References Cited

U.S. PATENT DOCUMENTS

| 3,490,147 | A |   | 1/1970  | Brichard et al. |
|-----------|---|---|---------|-----------------|
| 5,835,684 | A | * | 11/1998 | Bourne et al. ............... 700/255 |
| 5,880,965 | A |   | 3/1999  | Nakamura et al. |
| 5,969,973 | A | * | 10/1999 | Bourne et al. ............... 700/165 |
| 6,243,611 | B1|   | 6/2001  | Hazama et al. |

FOREIGN PATENT DOCUMENTS

GB    1212126    11/1970

(Continued)

OTHER PUBLICATIONS

English Language Abstract of 6-168248, Published Jun. 14, 1994.

(Continued)

*Primary Examiner*—Dana Ross
(74) *Attorney, Agent, or Firm*—Greenblum & Bernstein, P.L.C.

(57) ABSTRACT

A complex working system for sheet metal working comprising a sheet metal working line having at least a first step working cell and a subsequent second step working cell, wherein a working schedule for the second step working cell is first determined. A working schedule for the first step working cell is then determined based on the working schedule for the second step working cell, and the scheduled operation of the first and the second step working cells is executed according to the determined working schedules.

13 Claims, 14 Drawing Sheets

FOREIGN PATENT DOCUMENTS

| | | |
|---|---|---|
| JP | 4-199303 | 7/1992 |
| JP | 5-189446 | 7/1993 |
| JP | 5-189447 | 7/1993 |
| JP | 6-168248 | 6/1994 |
| JP | 9-81633 | 3/1997 |
| JP | 2000-33541 | 2/2000 |
| JP | 2000-280146 | 10/2000 |
| JP | 2000-280149 | 10/2000 |

OTHER PUBLICATIONS

English Language Abstract of 2000-280146, Published Oct. 10, 2000.
English Language Abstract of 2000-180149, Published Oct. 10, 2000.
English Language Abstract of 9-81633, Published Mar. 28, 1997.
English Language Abstract of 4-199303, Published Jul. 20, 1992.
English Language Abstract of 5-189446, Published Jul. 30, 1993.
English Language Abstract of 5-189447, Published Jul. 30, 1993.
English Language Abstract of 2000-33541, Published Feb. 2, 2000.
English Language Abstract of JP 6-168248.

\* cited by examiner

FIG.7

| Parts number | First work equipment | Second work equipment | Third work equipment | · · · · | m1-th work equipment |
|---|---|---|---|---|---|
| P1 | NCT1 | ARB1 | MPB1 | | |
| P2 | NCT1 | ARB1 | | | |
| · · · | · · · | · · · | | | |
| Pn | NCT1 | MPB1 | | | |

FIG.9

| Parts number | Step code | First step | | | Second step | | ... | m2-th step |
|---|---|---|---|---|---|---|---|---|
| | | Step | Work equipment | ... | Approved grouping constrained conditions | Step | Work equipment | ... | |
| P1 | NA1 | Punching | NCT1 | | | Bending | ARB1 | | |
| P1 | NM1 | Punching | NCT1 | | | Bending | MPB1 | | |
| P2 | NA1 | Punching | NCT1 | | | Bending | ARB1 | | |
| ... | ... | ... | ... | | | ... | ... | | |
| Pn | NM1 | Punching | NCT1 | | | Bending | MPB1 | | |

FIG.10

| Grouping code | Step | Work equipment | ... | Priority level | First condition | | Second condition | | Third condition | | Fourth condition | | n1-th condition |
|---|---|---|---|---|---|---|---|---|---|---|---|---|---|
| | | | | | Constrained condition | Priority level | Constrained condition | Priority level | Constrained condition | Priority level | Constrained condition | Priority level | |
| G11 | Punching | NCT1 | | 1 | Delivery date | 1 | | 2 | | | | | |
| G12 | Punching | NCT1 | | 2 | Delivery date | 1 | By material | 2 | By mold | 3 | | | |
| G13 | Punching | NCT1 | | 3 | Delivery date | 1 | By mold | 2 | By material | 3 | | | |
| G14 | Punching | NCT1 | | 4 | Delivery date | 1 | By material | 2 | By mold | 3 | Blanking | 4 | |
| ... | ... | | | | | | | | | | | | |
| G1n | Bending | ARB1 | | | | | | | | | | | |

FIG.11

| Work instruction order | Parts number | Number of working | Used material (replacement planning) | Material pallet replacement | Delivery date | Single piece take-up & transportation | Used mold (replacement planning) | Working, classification, accumulation, and transportation | Half-finished goods pallet replacement |
|---|---|---|---|---|---|---|---|---|---|
| 1 | P1 | 1 | SPC1.04×8 | P01 | 10/10 | | A type | | P11 |
| 2 | P2 | 2 | SPC1.03×6 | P02 | 10/10 | | B type | | P11 |
| 3 | P3 | 1 | SPC1.63×6 | P03 | 10/10 | | C type | | P11 |
| 4 | P4 | 3 | SPC1.04×8 | P01 | 10/10 | | B type | | P11 |
| 5 | P5 | 1 | SPC1.03×6 | P02 | 10/10 | | A type | | P11 |
| 6 | P6 | 4 | SPC1.64×8 | P04 | 10/10 | | C type | | P11 |
| 7 | P7 | 1 | SPC1.04×8 | P01 | 10/11 | | D type | | |
| ...... | | | | | | | | | |
| N | Pn | 1 | SPC1.04×8 | P01 | 10/12 | | A type | | P11 |

FIG.12

| Working order | Parts number | Occurrence of planning | By material | By mold |
|---|---|---|---|---|
| 1 | P1 | Twice | SPC1.04×8 | A type |
| 2 | P2 | Twice | SPC1.03×6 | B type |
| 3 | P3 | Twice | SPC1.63×6 | C type |
| 4 | P4 | Twice | SPC1.04×8 | B type |
| 5 | P5 | Twice | SPC1.03×6 | A type |
| 6 | P6 | Twice | SPC1.64×8 | C type |

FIG.13

| Working order | Parts number | Occurrence of planning | By material | By mold |
|---|---|---|---|---|
| 1 | P1 | Twice | SPC1.04×8 | A type |
| 2 | P4 | Once | | B type |
| 3 | P2 | Once | SPC1.03×6 | |
| 4 | P5 | Once | | A type |
| 5 | P6 | Twice | SPC1.64×8 | C type |
| 6 | P3 | Once | SPC1.63×6 | |

FIG.14

| Working order | Parts number | Occurrence of planning | By material | By mold |
|---|---|---|---|---|
| 1 | P1 | Twice | SPC1.04×8 | A type |
| 2 | P5 | Once | SPC1.03×6 | |
| 3 | P2 | Once | | B type |
| 4 | P4 | Once | SPC1.04×8 | |
| 5 | P6 | Twice | SPC1.64×8 | C type |
| 6 | P3 | Once | SPC1.63×6 | |

FIG.15

| Working order | Parts number | Occurrence of planning | By material | By mold |
|---|---|---|---|---|
| 1 | P1 | Twice | SPC1.04×8 | A type |
| 2 | P5 | | | |
| 3 | P2 | Once | | B type |
| 4 | P4 | | | |
| 5 | P3 | Twice | SPC1.64×8 | C type |
| 6 | P6 | | | |

# COMPOUND PROCESSING SYSTEM FOR SHEET METAL PROCESSING

TECHNICAL FIELD

The present invention relates to a complex working system for sheet metal working applied to a sheet metal working line, for example, equipped with a punching cell and a subsequent bending cell.

BACKGROUND ART

Conventionally, there is a production method of sheet metal products through blanking and bending, such that a sheet material is subjected to blanking by the punching cell, and the obtained parts is subjected to bending by the bending cell (Japanese patent publication: Japanese Patent Application Laid-open No. 2000-33541).

However, with such a conventional technique, bending can be executed by the bending cell, after blanking a sheet material by the punching cell, and then (1) disjointing, (2) classifying parts, (3) searching a part from the classified interim inventory (half-finished goods), and (4) performing bending planning (replacement of required mold, material setting, calling data). Therefore, time and labor are inevitably required for disjointing, parts classification, parts search, and bending planning. It is not so bothersome when a large lot is handled, but in the case of variety and variant production in which various different parts are handled in a small lot, lots of time and labor are required, thereby considerably reducing the productivity.

In view of the above situation, it is an object of the present invention to provide a complex working system for sheet metal working, which is applied to a sheet metal working line equipped with a pre-step working cell and a subsequent post-step working cell, for example, blanking and bending by the punching cell and the bending cell, to considerably improve the productivity in the variety and variant small-lot production, while excluding problems in the conventional system.

DISCLOSURE OF THE INVENTION

In order to achieve the above object, the complex working system for sheet metal working according to a first aspect of the invention is a complex working system for sheet metal working, in which in a sheet metal working line equipped with at least a first step working cell and a subsequent second step working cell, after the working schedule for the second step working cell is determined, the working schedule for the first step working cell is determined based on the working schedule for the second step working cell, and the scheduled operation of the first and the second working cells are executed according to the determined working schedules.

The complex working system for sheet metal working according to a second aspect of the invention is a complex working system for sheet metal working, in which in a complex working line including a turret punching cell having an NCT and a bending robot cell having a bending robot, after the working schedule for the bending robot cell is determined, the working schedule for the turret punching cell is determined based on the working schedule for the bending robot cell, and the operation of the turret punching cell and the bending robot cell are executed according to the determined working schedules.

According to the configuration of the invention, in the sheet metal working line including at least the first step working cell and the subsequent second step working cell, after the working schedule for the second step working cell is determined, the working schedule for the first step working cell is determined based on the working schedule for the second step working cell, and the scheduled operation of the first and the second working cells are executed according to the determined working schedules. Therefore, the present invention can be applied to a sheet metal working line including, for example, the pre-step working cell and the subsequent post-step working cell, such as blanking and bending by the punching cell and the bending cell, to considerably improve the productivity in the variety and variant small-lot production. As a result, not only in the case of the variety and variant small-lot production, but also in the case of assembly setting, the productivity can be considerably improved. Further, the present invention can be applied not only to the blanking and bending by the punching cell and the bending cell, but also to a sheet metal working line having various pre-step working cells and the subsequent post-step working cells, thereby realizing a considerable improvement in the productivity.

BRIEF DESCRIPTION OF THE DRAWINGS

FIG. 7 is a diagram showing one example of contents of a parts information master in parts master groups.

FIG. 9 is a diagram showing one example of contents of a parts step master in parts master groups.

FIG. 10 is a diagram showing one example of contents of grouping information in parts master groups.

FIG. 11 is a diagram showing one example of various kinds of planning in the production arrangement for the respective parts.

FIG. 12 is a diagram showing the planning frequency in the case of a grouping code G11 shown in FIG. 10.

FIG. 13 is a diagram showing the planning frequency in the case of a grouping code G12 shown in FIG. 10.

FIG. 14 is a diagram showing the planning frequency in the case of a grouping code G13 shown in FIG. 10.

FIG. 15 is a diagram showing the planning frequency in the case of a grouping code G14 shown in FIG. 10.

BEST MODE FOR CARRYING OUT THE INVENTION

Exemplary embodiments of the present invention will be described below with reference to the accompanying drawings.

Figure 1:
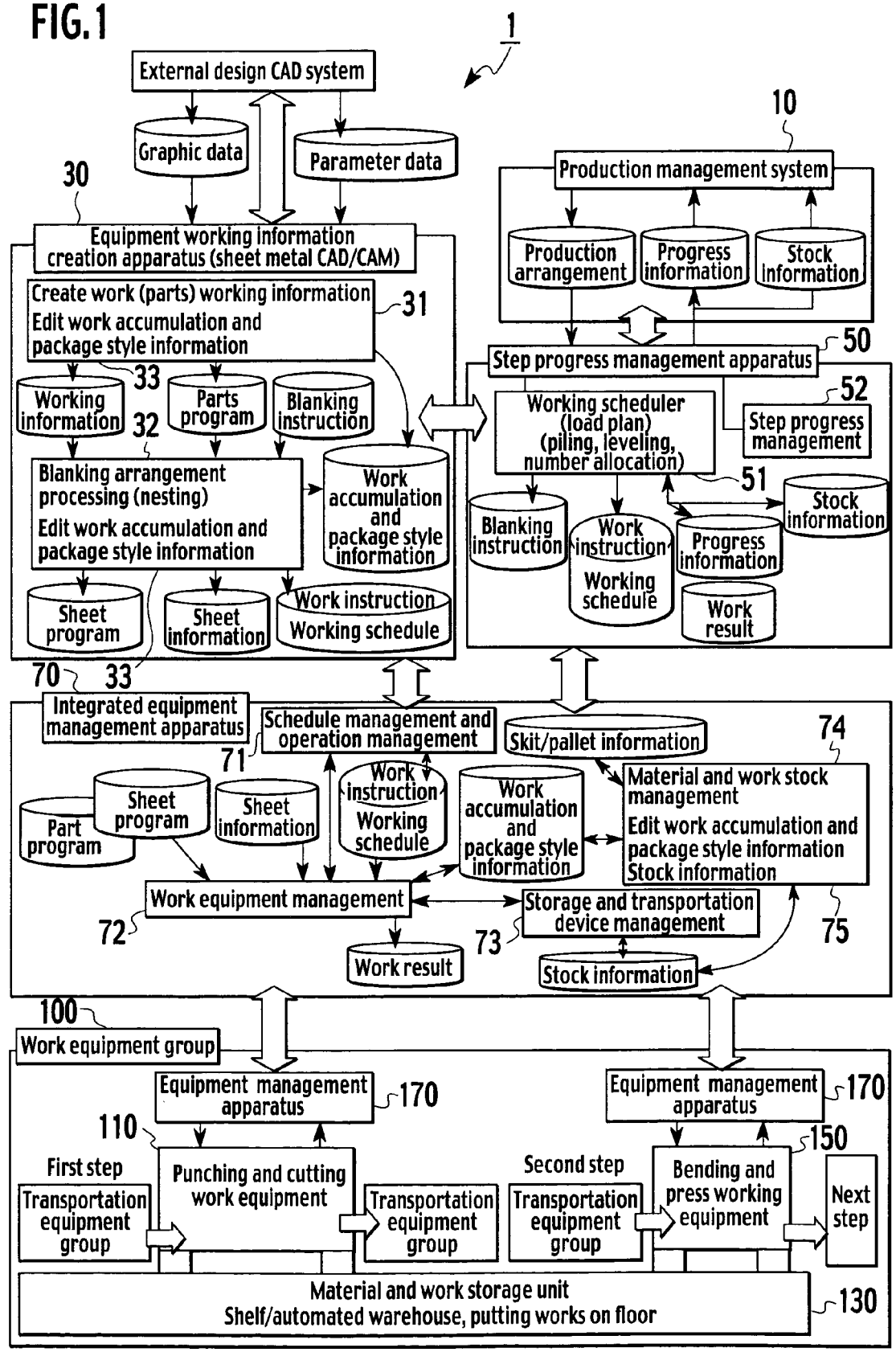
FIG. 1 is a system block diagram showing one embodiment of the complex working system for sheet metal working according to the present invention.
Figure 2:
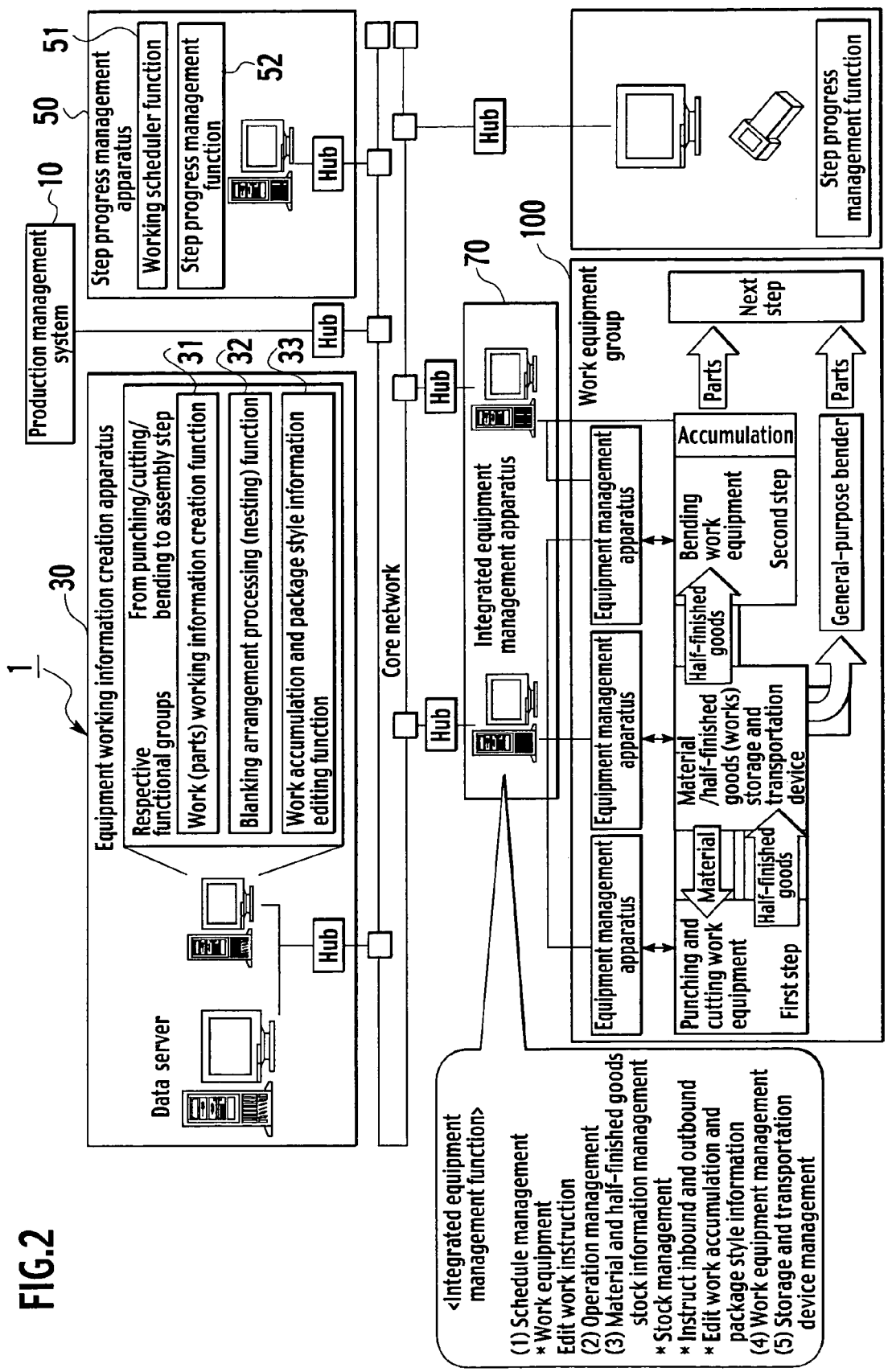
FIG. 2 is a block diagram showing a network for the complex working system for sheet metal working.
Figure 3:
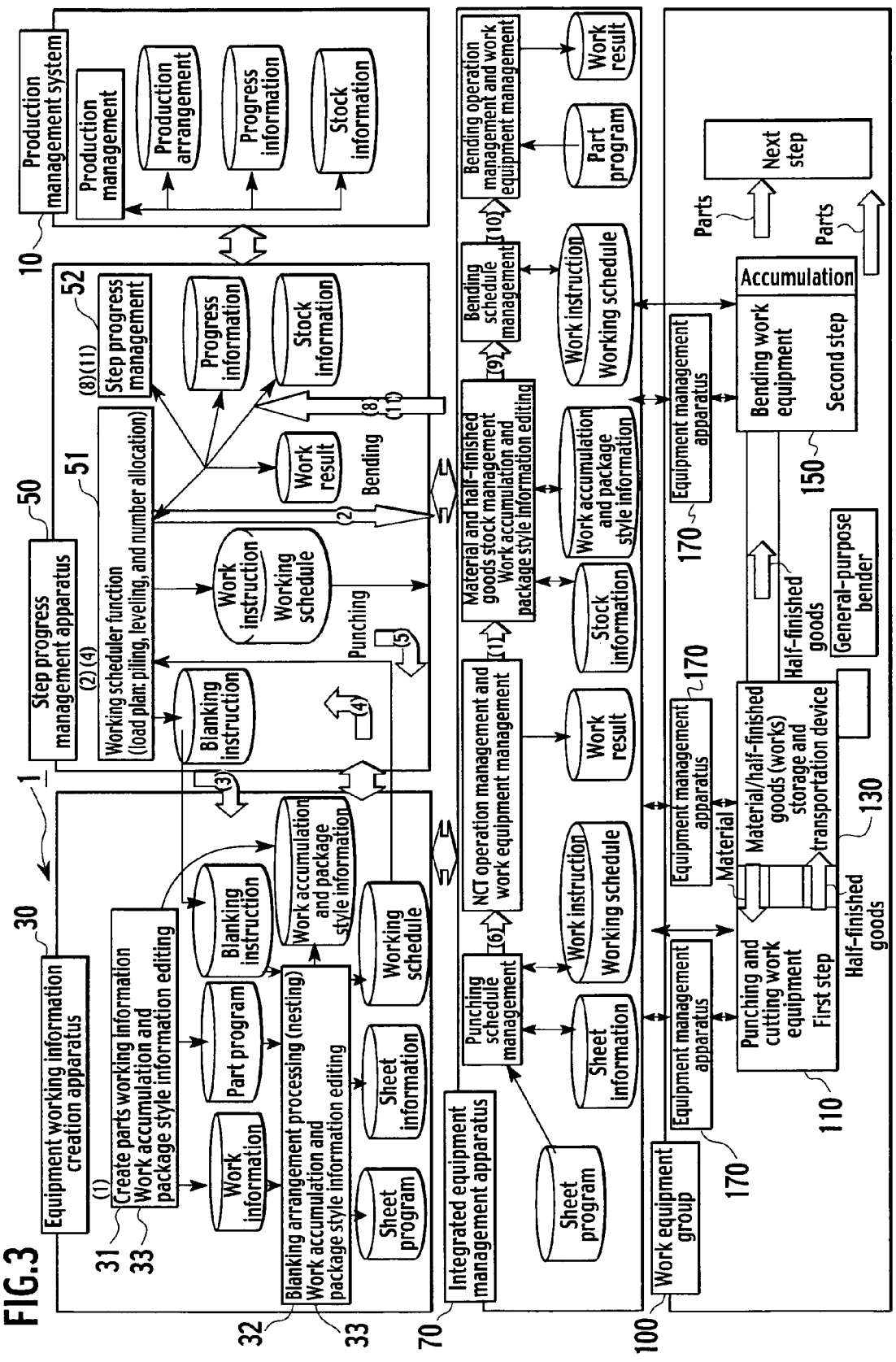
FIG. 3 is a system operation diagram of the complex working system for sheet metal working.

FIG. 1 is a system block diagram showing one embodiment of the complex working system for sheet metal working according to the present invention, FIG. 2 is a block diagram of a network, and FIG. 3 is a system operation diagram. The complex working system 1 for sheet metal working is a system for realizing production for both of the variety and variant small-lot production and the assembly setting, which is a PULL type scheduled production execution system in which a work instruction (working schedule) for a bending step in parts supply is created from work instructions (working schedules) for product assembly and shipping steps, according to coordinated operation of various types of information system apparatus and work equipment groups described below, and the work instruction (working schedule) for the bending step is reflected in the work instruction (working schedule) for punching and cutting steps, being pre-steps. Therefore, the complex working system 1 for sheet metal working comprises a production management system 10, an equipment working information creation apparatus (sheet metal CAD/CAM) 30, a step progress management apparatus 50, a uniform equipment management apparatus 70, and work equipment groups 100.

The production management system 10 is for managing production arrangement, progress information, and stock information relating to the production management of the whole system, and transfers the information to and from the step progress management apparatus 50.

The equipment working information creation apparatus (sheet metal CAD/CAM) 30 creates working information for the punching and cutting steps to the bending and assembly steps of the respective works (parts), and comprises a work (parts) working information creation function 31, a blanking arrangement processing (nesting) function 32, and a work accumulation and package style information editing function 33.

Of these, the work (parts) working information creation function 31 is for creating working information and a parts program for work equipment in each step, and the working information includes a CAD development, a stereograph, used tool information, and other kinds of information. Thus, sharing of various kinds of data in the punching and cutting steps through to the bending step and uniform management are realized.

The blanking arrangement processing (nesting) function 32 is for creating a sheet program, sheet information, and working schedule by performing blanking arrangement for a work (parts) group to be worked in the respective work equipment on a material under specified classification conditions. The items in the specified classification conditions include material information, plate thickness, material quality, material size, used tool information, delivery time, production order number, and post-steps.

The blanking arrangement processing (nesting) function 32 creates nesting instruction information by combining blanking work instruction information created according to the PULL method from a working scheduler function 51 in the step progress management apparatus 50 and the accumulation and package style information on a pallet taking the post-steps into consideration, executes the blanking arrangement processing (nesting), creates a punching step sheet program and a work instruction (working schedule), and also creates a bending step work instruction. In the blanking processing herein, micro-jointless working is performed after punching, and a sheet program for classifying and accumulating parts on an accumulation pallet by a classification and accumulation apparatus 112, while separating the parts one by one, and delivery information of parts to and from the post-steps are created. The work instruction is automatically reported to the working scheduler function 51 of the step progress management apparatus 50, and the finally fixed work instruction is handed over to the uniform equipment management apparatus 70, to perform automatic working in each step. However, when there is no cooperation with the step progress management apparatus 50 at the time of operating the system, the created work instruction can be handed over to the uniform equipment management apparatus 70 directly.

The work accumulation and package style information editing function 33 is for allowing to specify work supply in the work equipment, and transportation and accumulation instructions to the accumulation apparatus, at the time of working of the respective works (parts). In other words, accumulation and classification instructions taking the post-step of the parts into consideration are provided to execute the blanking arrangement processing. This function can be also realized by the uniform equipment management apparatus 70 at the site. As a result, a punching instruction can be given, taking into consideration accumulation of materials and half-finished goods (works) at the site and the package style at the time of transportation.

The step progress management apparatus 50 manages the step progress in the whole steps from punching and cutting steps through the bending and assembly steps to the shipping step of the respective works (parts), and includes the working scheduler function 51 and a step progress management function 52.

The working scheduler function 51 performs load planning (piling, leveling, number allocation to the work equipment) processing by the PULL type production management method, wherein the parts supply schedule from the work instruction (working schedule) for product shipment and the assembly step leads to a bending step work instruction, and a punching step work instruction is also created. As a result, reduction in stocks of half-finished goods and in process lead-time can be achieved between the respective steps. Moreover, a planning instruction schedule for searching, transporting, and setting works of materials and half-finished goods (works) between previous and subsequent steps with respect to the work equipment is created, synchronously with the work instruction (working schedule) for increasing the operating ratio of the work equipment in each step and decreasing the number of steps for work planning. Furthermore, the step progress management apparatus 50 has a configuration such that blanking instruction information when a plurality of parts is worked on a material while being blanking-arranged, an instruction to the blanking arrangement processing (nesting) function 32 by the equipment working information creation apparatus (sheet metal CAD/CAM) 30, and the processing result information are handed over for the work equipment. The step progress management apparatus 50 also provides work instructions according to the production operation mode of the work in the work equipment, for example, for performing sketch material working (1 material: 1 parts), multiple piece take-up working (1 material: a plurality of same parts), blanking arranged sheet processing (1 material: a plurality of kinds/a plurality of parts), and assembly setting (P1 to Pn)×M.

The step progress management function 52 collects the work results at the time of completion of working by the respective work equipment, based on the work instruction (working schedule) by the work equipment in each step with respect to the respective parts, to manage the step progress between the respective steps. The step progress management function 52 also performs stock management of materials and half-finished goods (works) between the respective steps (a storage and transportation device, putting works on a floor), and in the work equipment.

The uniform equipment management apparatus 70 includes a schedule management and operation management function 71, a work equipment management function 72, a storage and transportation device management function 73, a material and half-finished goods (works) stock management function 74, and a work accumulation and package style information editing function 75.

Among these functions, the schedule management and operation management function 71 is for performing editing of a work instruction (working schedule) instructed by the step progress management apparatus 50 or the blanking arrangement processing function blanking arrangement processing (nesting) function 32, and a work instruction created by the schedule management function 71, without suspending the equipment during the automatic operation. The schedule management and operation management function 71 also performs on-line schedule operation management of the line of the turret punching cell (NCT) 110 and the bending robot cell 150, for example, start-up and stop instructions, operation condition monitoring, alarm reset processing, as well as management of a single cell operation mode, a complex cell operation mode, and a complex straight line operation mode.

The work equipment management function 72 is for instructing transportation and working of the materials and half-finished goods (works) based on the work instruction (working schedule) by the respective work equipment, and performs management of working by the work equipment and high-speed classification and accumulation by the classification and accumulation device 112, reserves the material pallets, and accumulates pallets loaded with the half-finished goods, based on the work instruction (working schedule) in the NCT step. The accumulated half-finished goods information includes post-step delivery information (work ID, post-step ID, accumulated position information, accumulation and single piece take-up instruction information) created in the blanking arrangement processing. A work instruction for the bending step is also provided. In other words, on-line operation of the single piece take-up schedule based on the lot operation by the bending robot is executed according to the work instruction created by the working scheduler function 51 of the step progress management apparatus 50, or by the schedule management.

The storage and transportation device management function 73 is for performing storage and automatic transportation management between the work equipment.

The material and half-finished goods (works) stock management function 74 is for performing accumulation stock management (parts number, production lot number, inventory information, next step, etc.) in a visual display (birds-eye view, plan view) format, with respect to the accumulated half-finished goods (works), and instructing storage and inbound and outbound of the material and half-finished goods (works) between work equipment.

The work accumulation and package style information editing function 75 is for instructing accumulation and classification, and then execution thereof is performed by the blanking arrangement processing. With this function, an instruction can be also given by the equipment working information creation apparatus (sheet metal CAD/CAM) 30 in an office. As a result, punching instruction can be provided, taking into consideration accumulation of the materials and half-finished goods (works) at the site and the package style at the time of transportation.

The work equipment group 100 includes punching and cutting step work equipment (turret punching cell) 110, storage and transportation device 130 for materials and half-finished goods (works), bending step work equipment (bending robot cell) 150, and an equipment management apparatus 170 for these respective work equipment.

Figure 4:
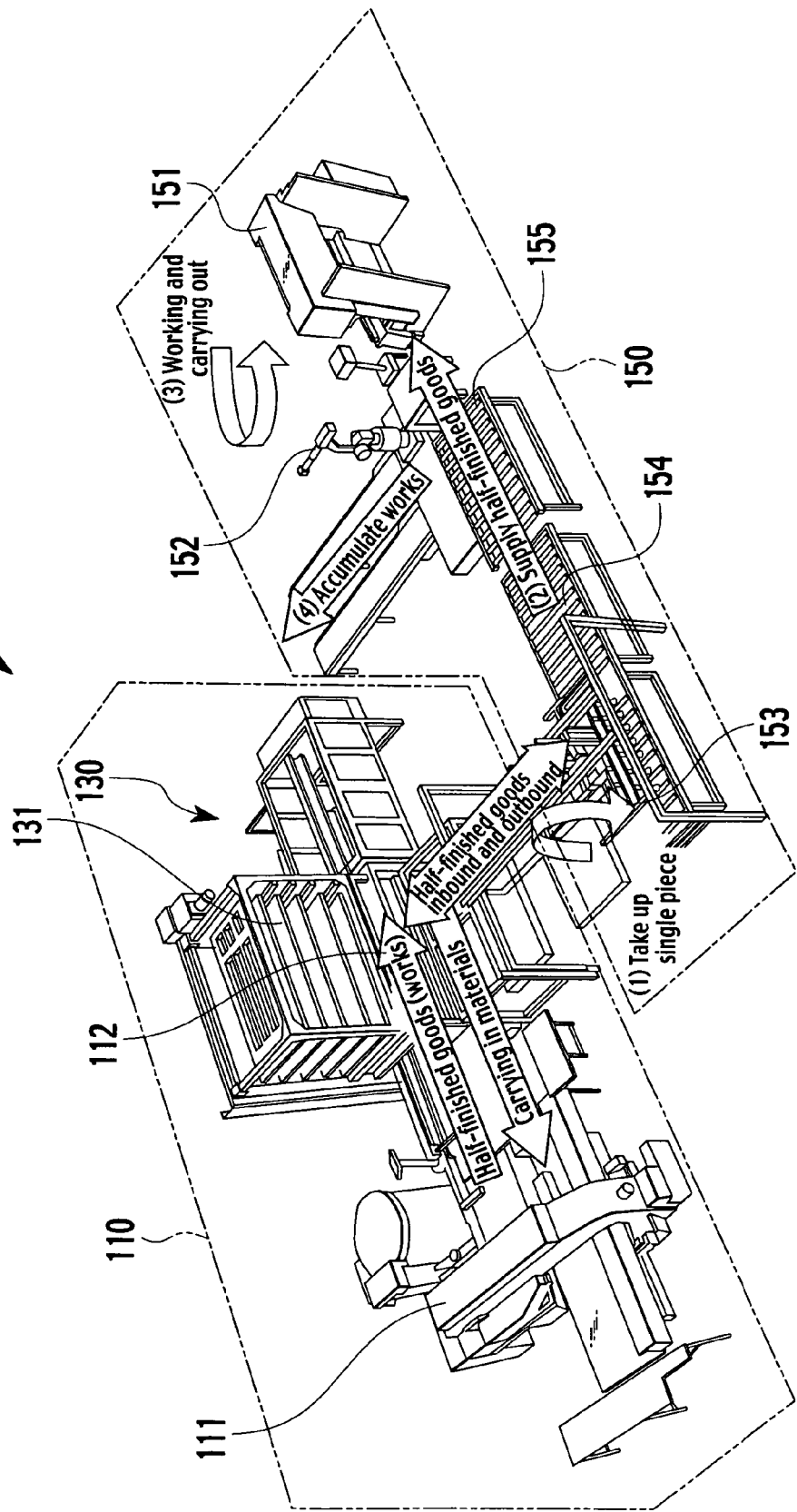
FIG. 4 is a perspective view showing work equipment groups in the complex working system for sheet metal working.
Figure 5:
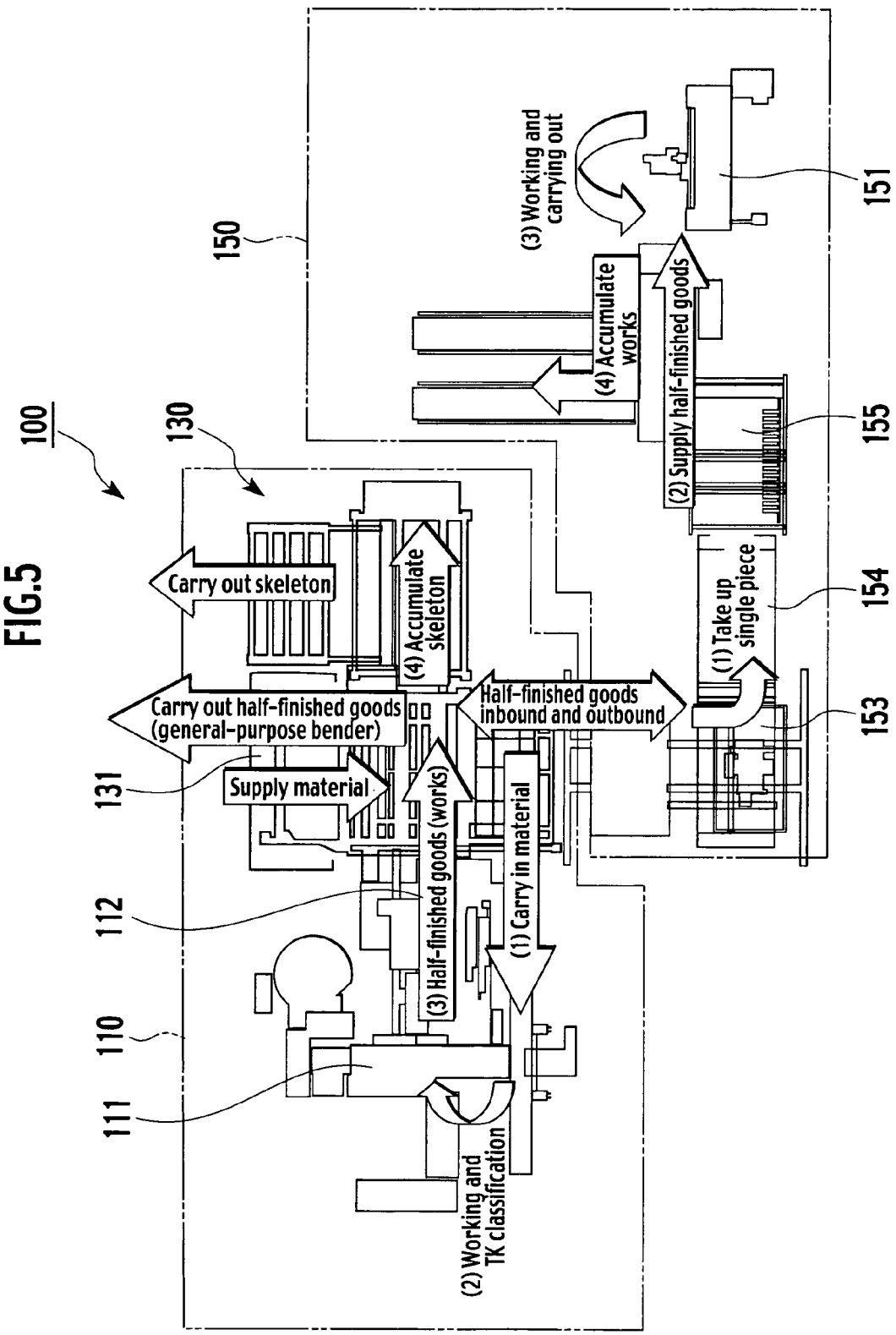
FIG. 5 is a plan view showing the work equipment groups in the complex working system for sheet metal working.

As shown in FIGS. 4 and 5, the punching and cutting step work equipment (turret punching cell) 110 includes a turret punching press (NCT) 111 having an automatic tool changer (ATC) by which mold change, being a bottleneck in the punching automation, can be automated, and a classification and accumulation device 112 which classifies and accumulates parts on the accumulation pallet, while separating the parts (parts/blanking material) one by one from the material (work/sheet material), after performing punching and micro-jointless working. Not only the micro-jointless working but also micro-joint working and sketch material working can be executed by carrying out by clamps.

The storage and transportation device 130 for materials and half-finished goods (works) includes a material and half-finished goods (works) accumulating stocker 131 of a front open type having multiple tiers (for example, six stages), in which materials and half-finished goods (works) can be set in a plurality of pallets in each tier, thereby corresponding to long-time operation of the NCT and the bending robot. Since it is the front open type, manual off-line working is possible, and hence correspondence to a rush job is possible.

The bending step work equipment (bending robot cell) 150 comprises a press brake (bending robot) 151 having an automatic tool changer (ATC) and an automatic gripper changer, a handling robot 152, a single piece take-up device 153 which supplies a parts to be bent one by one for each pile of parts classified and accumulated on the pallet by the classification and accumulation device 112 in the pre-step, a roller conveyor 154 which transports and positions a parts supplied one by one by the single piece take-up device 153 to a picking position of the bending robot, and a cell single operating parts supply station 155 which can correspond to a bending step rushed in from a single NCT or the like.

Further, the equipment management apparatus 170 manages the operation of the punching and cutting step work equipment (turret punching cell) 110, the storage and transportation device 130 for materials and half-finished goods (works), and the bending step work equipment (bending robot cell) 150, based on the work instruction (working schedule) from the uniform equipment management apparatus 70.

Since having the work equipment groups 100, the complex working system 1 for sheet metal working has the following characteristics. That is, the micro-jointless working makes the disjoining time unnecessary, and planning for the post-step is not required. Since the parts is hardly damaged, the quality is improved and defectiveness is reduced. The accumulation of parts makes it unnecessary to classify the parts, and planning for the post-step is not required. The single piece take-up device makes it unnecessary to search a parts, and the planning time for the material is not required. Since various kinds of materials can be planned collectively, the material pallet can be used effectively. Since continuous operation is possible for the same parts even in the case of loading a plurality of parts, the operating ratio of the bending machine is improved. Automation is possible regardless of the bending machine in the post-step. Automation of blanking and bending makes it unnecessary to plan bending materials, thereby improving the operating ratio of the bending machine. Since the unattended operation is possible up to bending, productivity is improved. Since parts for from blanking to bending are managed by uniform management of the parts data, record on-site is not necessary. Since the achievement management is possible in a unit of parts, planning for working schedule is not required. Further, since working schedule can be prepared, giving priority to the post-steps, the complex working system 1 for sheet metal working is suitable for the variety and variant production. As a result, it is obvious that the productivity of the bending machine is considerably improved.

The operation of the embodiment will be described, referring to the flowchart shown in FIG. 6, with reference to FIGS. 7 to 17.

At the time of operation of the complex working system 1 for sheet metal working, it is necessary to perform grouping processing of the working schedules of the respective parts, and the object thereof will be described first.

Firstly, it is to reduce the total working time (lead time) in each step (punching and bending) and between steps, to reduce the cost. That is, reduction in the number of steps (cost) and the time (lead time) for various planning works contributes to the improvement in the performance by the working schedule of each working machine, thereby increasing the overall operating ratio and the productivity.

Secondly, it is to keep the production form in the subsequent step. That is, the lead-time in the whole steps can be reduced by keeping the delivery period to the subsequent step and strictly keeping the shipping date of the final product. It is similarly important to keep the working sequence for the assembly set working.

Thirdly, it is to reduce the interim inventory (half-finished goods) in each step (punching and bending) and between steps. As a result, the stock and the cost for the storage space can be reduced.

Fourthly, it is because the necessary working machine, materials, mold, and tools are limited, in order to perform working satisfying the constrained conditions (part size, shape, material, working quality, etc.) in working of the respective parts in each step (punching and bending) and between steps.

To realize these objects effectively, grouping processing is required with respect to the parts. The grouping processing of the working schedules is for determining the grouping condition having the minimum frequency of various kinds of planning (total planning time), from various constrained conditions for working schedules, while changing the grouping constrained condition for the working schedules for the respective parts and the priority, with respect to the whole production arrangements, to reduce the total working time (lead time) for all parts in each step (punching and bending).

The elements as the grouping constrained conditions to be used at this time include: (1) delivery date (parts classification by same delivery date); (2) by material (parts classification by same material to be used); (3) by material planning time (parts classification by material planning time); (4) by mold (parts classification by same mold to be used); (5) by mold planning time (parts classification by mold planning time); (6) by planning other than mold (parts classification by same planning except for mold); (7) by planning time for other than mold (parts classification by planning time in a unit of same planning except for mold); (8) working time (parts classification by working time of respective parts); (9) working sequence (parts classification by specified working sequence and priority), and others specified by users.

Figure 6:
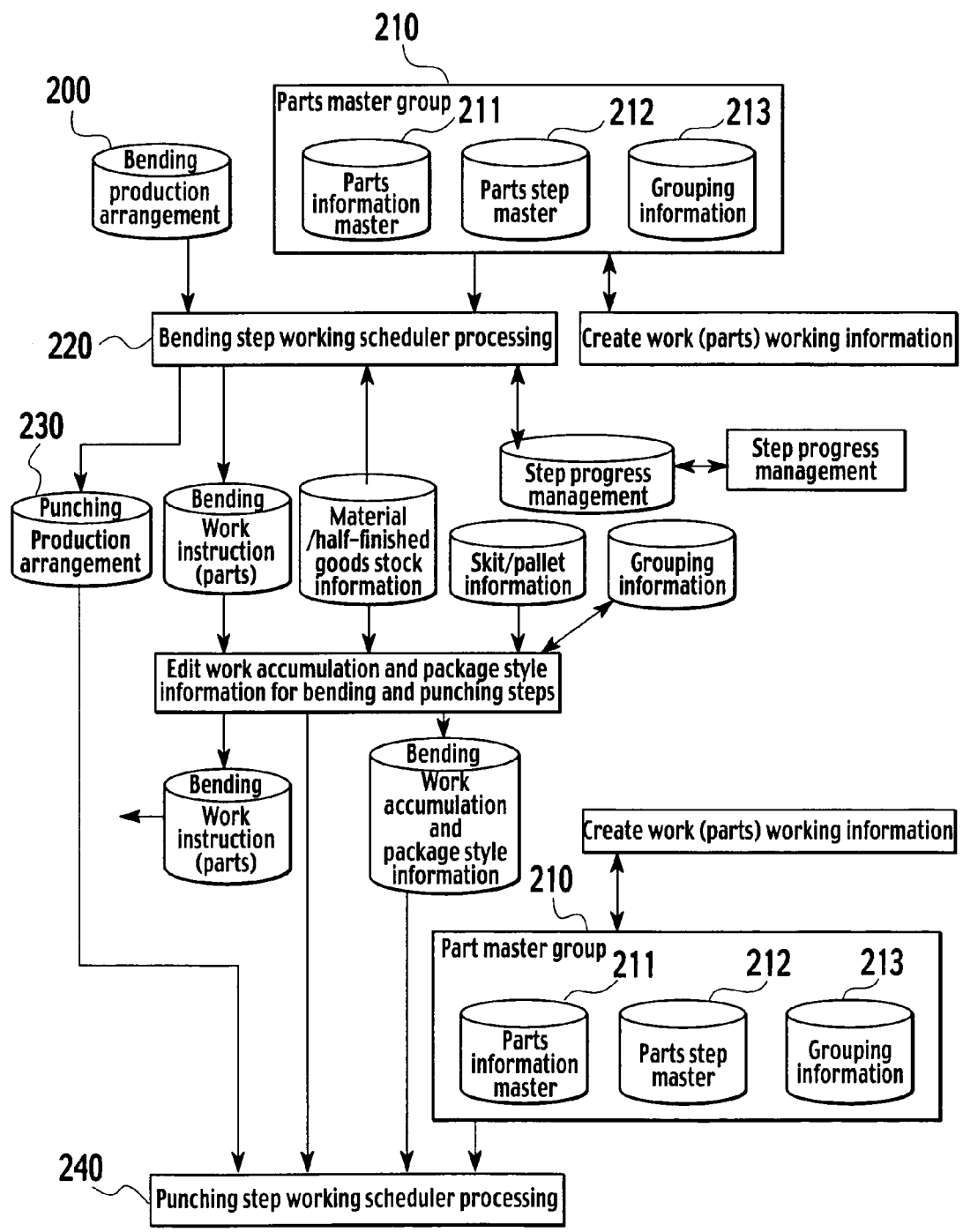
FIG. 6 is a flowchart of the complex working system for sheet metal working.

As shown in FIG. 6, bending step working scheduler processing 220 is executed with reference to the contents in a parts information master 211, a parts step master 212, and grouping information 213 in a parts master group 210, based on bending production arrangement 200, and as a result, punching production arrangement 230 is prepared.

Based on the punching production arrangement 230, punching step working scheduler processing 240 is executed, with reference to the contents in the parts information master 211, the parts step master 212, and the grouping information 213 in the parts master group 210.

Figure 8C:
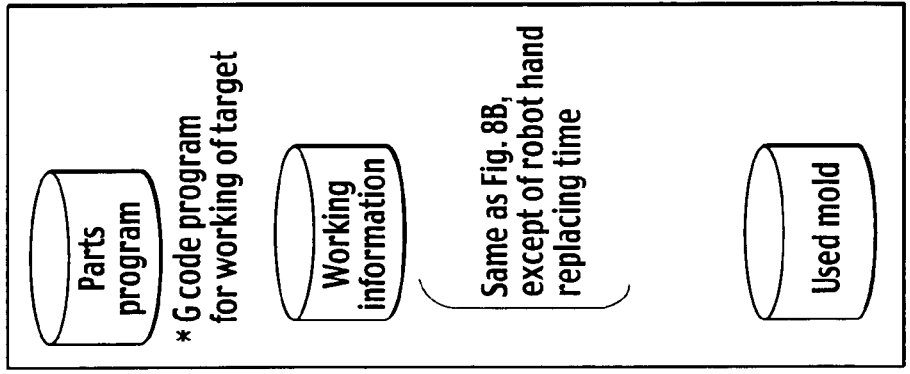
FIGS. 8A, 8B, and 8C are diagrams showing various kinds of information managed by the parts information master for each work equipment.
Figure 8B:
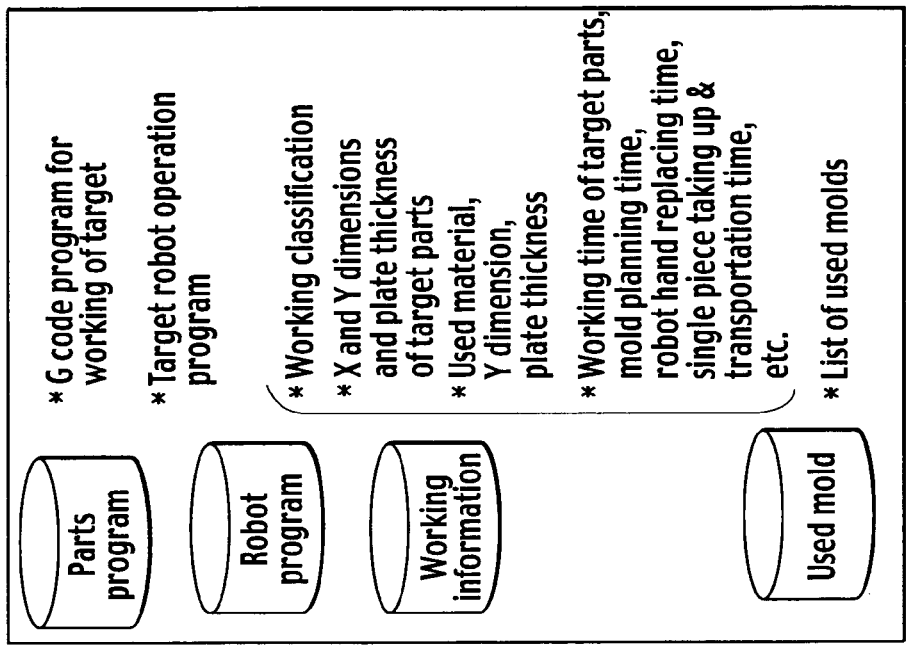
Figure 8A:
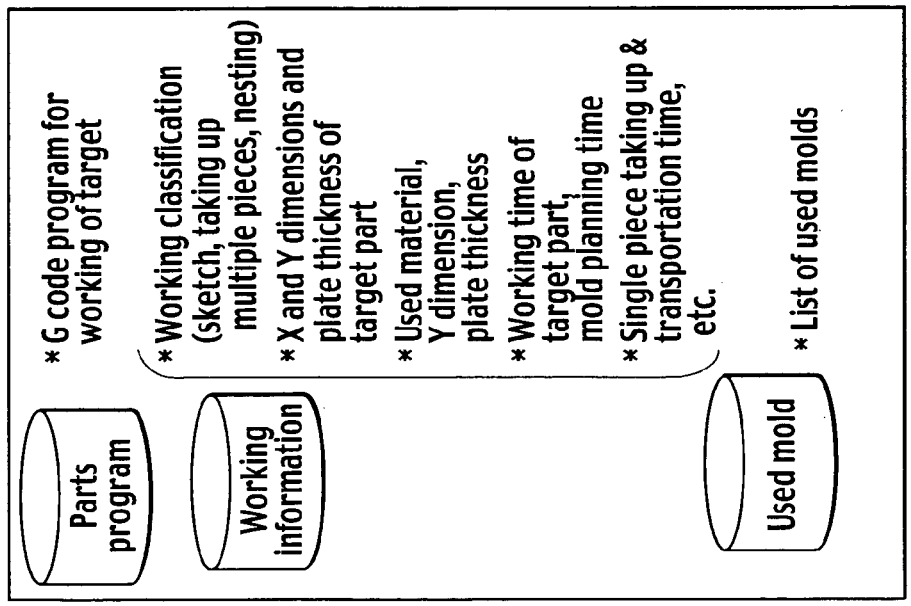

FIG. 7 shows one example of contents of the parts information master 211 in the parts master group 210. The parts information master 211 is for uniformly managing various kinds of working information by the respective work equipment for respective parts. "Parts number" is for managing the stereograph (with a bending attribute) and development graphic data of respective parts. For example, various kinds of information as shown in FIG. 8A are managed for "NCT1" (punching work equipment), and various kinds of information as shown in FIG. 8B are managed for "ARB1" (automatic robot bender work equipment). Further, various kinds of information as shown in FIG. 8C are managed for "MPB1" (general-purpose manual bender work equipment).

FIG. 9 shows one example of the contents of the parts step master 212 in the parts master group 210. The parts step master 212 is for managing the workable working step sequence of the respective parts, and is mainly used by the step progress management function. The "steps" include "punching", "bending", "cutting", "welding", "assembly" and the like. "Approved grouping constrained conditions" express constrained conditions, such as delivery date, by material, material planning time, by mold, mold planning time, working time, working sequence and the like, and a plurality of conditions can be specified. However, when there is no particular specification, it is assumed herein that all of these conditions should be satisfied.

FIG. 10 shows one example of the contents of the grouping information 213 in the parts master group 210. The grouping information 213 is used at the time of setting the constrained conditions for constraining working of respective parts by the target work equipment and the package style for transportation in a group, and is mainly used by the working scheduler processing function and the step progress management function, and in editing the work accumulation and package style information. "Grouping code" is a code classified based on the constraint instruction for each group, and is used in the work accumulation and package style information in the working scheduler processing function and the step progress management function, and in the blanking arrangement processing. "Priority level" indicates the priority in referring to the grouping code in the same step and same work equipment.

FIG. 11 shows one example of occurrence of various kinds of planning in the production arrangement of the respective parts. An example of various kinds of planning occurring from the grouping processing of the constrained conditions (when adapted only by material and by mold) in grouping the schedules, with respect to the production arrangement only for the same delivery date (production management system 10/10) by the same work equipment, is shown in FIGS. 12 to 15.

In other words, FIG. 12 shows an example when the production arrangement is performed in a general production management and step progress system, without taking into consideration various kinds of planning, and indicates a case of "grouping code" G11 in the grouping information shown in FIG. 10. In this case, since grouping is not performed by material, material planning is required for each working, thereby the material planning frequency being six times (shown by a triangle), and since grouping is not performed by mold, mold planning is required for each working, thereby the mold planning frequency being six times (shown by a triangle), in total, planning is required twelve times.

On the other hand, FIG. 13 shows a case in which working by material and by mold (sketch material) is performed, and indicates a case of "grouping code" G12 in the grouping information shown in FIG. 10. In this case, since grouping is performed by material, material planning is required four times (shown by a triangle). In addition, since grouping is performed by mold, mold planning is required four times (shown by a triangle), in total, planning is required eight times.

FIG. 14 shows a case in which working by mold and material (sketch material) is performed, and indicates a case of "grouping code" G13 in the grouping information shown in FIG. 10. In this case, since grouping is performed by mold, mold planning is required three times (shown by a triangle), and in addition thereto, since grouping is performed by material, material planning is required five times (shown by a triangle), in total, planning is required eight times.

FIG. 15 shows a case in which blanking arrangement processing is performed, taking by material and mold into consideration, and indicates a case of "grouping code" G14 in the grouping information shown in FIG. 10. In this case, since grouping is performed by material, material planning is performed only twice (shown by a triangle), and in addition thereto, since grouping is performed by mold, mold planning is performed only three times (shown by a triangle), in total, planning is required five times.

In this manner, it is obvious that the frequency of planning decreases in the case of performing grouping, as compared with the case of not performing grouping. Further, it is understood that even when the constrained conditions in grouping the schedules only by material and by mold are adapted, the frequency of material planning and mold planning is different according to the setting of the constrained conditions for grouping. Actually, elements such as working time and specified working sequence (priority level) have to be considered other than by material and by mold, as the constrained conditions for grouping the schedules. In addition, other than the constrained conditions for grouping the schedules, when various requirements such as accumulation and transportation, changing of half-finished goods pallets, other planning operation, and assembly setting are complex, planning is required more according to the priority in combining various requirements. These get entangled in a complicated manner, bringing various effects in reducing the working time.

Figure 16:
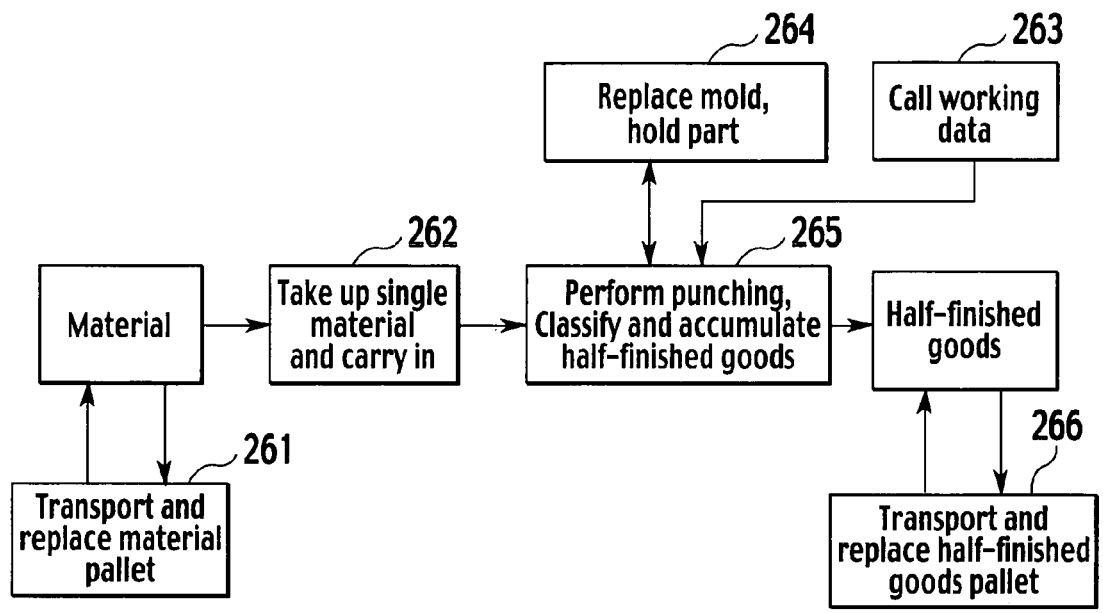
FIG. 16 is a diagram showing various kinds of planning occurring in a punching step in a punching and bending automated system.
Figure 17:
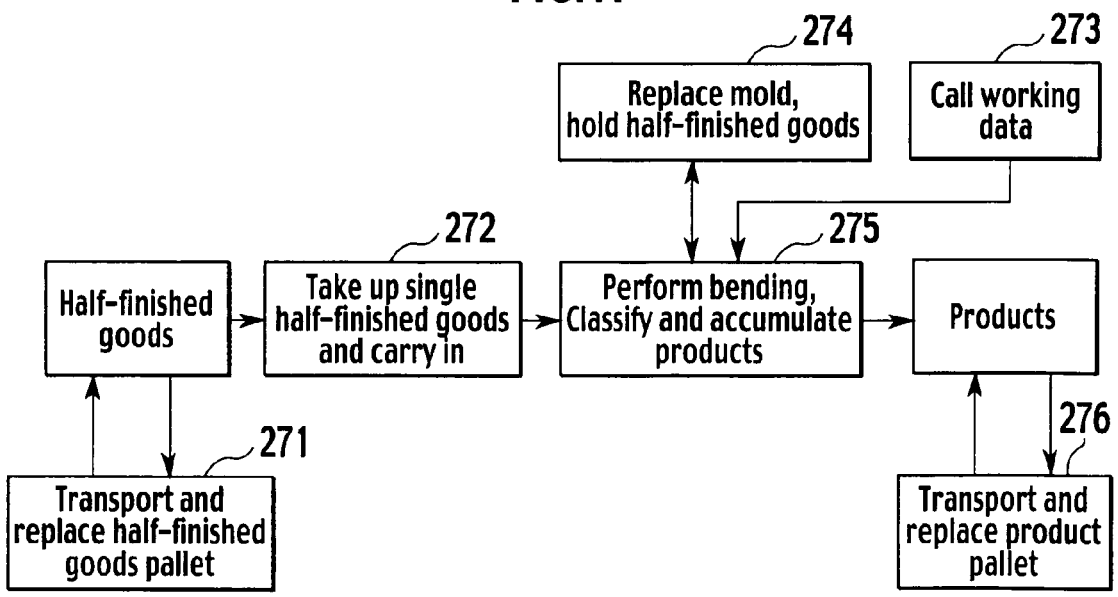
FIG. 17 is a diagram showing various kinds of planning occurring in a bending step in a punching and bending automated system.

For example, in the punching and bending automated system, the calculation processing of the total working time (tact time) includes items shown in FIGS. 16 and 17.

In other words, in the punching step, as shown in FIG. 16, various kinds of planning occur, such as (1) transportation and replacement of the material pallet 261, (2) single material taking up from the material pallet and carrying it to a punching machine 262, (3) calling of punching data 263, (4) replacement of mold and holding the parts 264 by the punching machine, (5) classification and accumulation 265 of punched half-finished goods to a half-finished goods pallet, and (6) transportation and replacement of half-finished goods pallet 266. Reduction in the processing time in these planning steps leads to reduction in the punching step time.

In the bending step, as shown in FIG. 17, various kinds of planning occur, such as (1) transportation and replacement of half-finished goods pallet 271, (2) single half-finished goods taking up from the half-finished goods pallet and carrying it to the bending machine 272, (3) calling of bending data 273, (4) replacement of mold and holding half-finished goods 274 by the bending machine, (5) classification and accumulation 275 of bent products to a product pallet, and (6) transportation and replacement of the product pallet 267. Reduction in the processing time in these planning steps leads to reduction in the bending step time.

The complex working system 1 for sheet metal working executes working scheduling for the pre-steps (punching and cutting steps) and automatic preparation processing of the working information, based on the working scheduling adjusted to the production and transportation planning operation mode in the post-step (bending step), associated with the step progress management, thereby realizing the variety and variant small-lot production, and reducing the number of planning between steps. Therefore, scheduling for the pre-steps, taking into consideration the working sequence in the post-step and the package style for transportation between steps, and creation of the working information (blanking arrangement processing and work accumulation and package style information editing function) can be realized. A mechanism for handing over the working results in the pre-steps, the stock information, the sheet information, and the work accumulation and package style information (including an instruction to the post-step) to the post-step can be realized. Moreover, automatic transportation and supply (classification, accumulation, transportation, and reduction in manual planning by automating the single piece take-up) between steps (punching and cutting steps to bending step) of respective parts can be realized by the classification and accumulation apparatus, the single piece take-up device, and the storage and transportation apparatus. Improvement in the operation efficiency in referring to data can be also realized by the uniform management of various kinds of information.

Further, the number of parts to be continuously auto-processed according to the scheduled operation can be dramatically increased by equipping the ATC apparatus. The kinds of workable bending shapes are considerably increased by the bending robot, to enlarge the possibility in the target work. Further, flexible line operation is enabled according to the respective operation modes, such as single-cell operation, complex cell operation, and straight complex working operation, thereby improving the versatility. In the single-cell operation, separate cell operation is possible respectively for punching and bending. In the complex cell operation, complex (punching→bending) cell operation in which a tact balance difference between punching and bending is absorbed can be realized, and in the straight complex working operation, synchronized production at the equal tact in punching and bending is realized. The classification and accumulation apparatus in punching enables micro-jointless working and classification and accumulation, and hence workers are released from the micro-disjointing operation and the classification operation. The single piece take-up device enables not only the operation of each cell and the straight complex working operation, but also tact balance matching between respective cells, thereby improving the productivity. The single piece take-up device and the automatic change function of the accumulation pallets releases the workers from search and transportation of parts, and the single piece take-up operation, thereby considerably improving the operating ratio of the bending robot cell. Since not only the micro-jointless working but also micro-joint working are possible, the operating ratio is considerably improved. Further, the classification function enables automatic classification and arrangement of parts, and handover to a general-purpose press-brake.

The present invention is not limited to the embodiment described above, and can be executed in other modes by performing appropriate changes.

The invention claimed is:

1. A system for working sheet metal, comprising:
    a first cell configured to produce at least one first part;
    a second cell configured to produce at least one second part; and
    a progress management apparatus having a work scheduler configured to produce work schedules so that a process of grouping work schedules of the first parts and second parts is performed according to a grouping constraint condition for grouping parts to be produced by the first cell and the second cell,
    wherein the system is configured to determine a working schedule for the second cell and to subsequently determine a working schedule for the first cell based on the working schedule for the second cell, the system being configured to work the sheet metal using the first cell and the second cell according to the determined working schedule for the first cell and the determined working schedule for the second cell.

2. The system according to claim 1, wherein the system uses a sheet metal working line including at least a turret punching cell including an NCT and a bending robot cell including a bending robot, the system being configured to determine a working schedule for the bending robot cell and to subsequently determine a working schedule for the turret punching cell based on the working schedule for the bending robot cell, the system being configured to work the sheet metal using the turret punching cell and the bending robot cell according to the determined working schedule for the turret punching cell and the determined working schedule for the bending robot cell.

3. The system for working sheet metal according to claim 1, wherein the grouping constraint condition is a delivery time of the parts.

4. The system for working sheet metal according to claim 1, wherein the grouping constraint condition is a categorization of the type of work performed on the parts by at least one of the first cell and the second cell.

5. The system for working sheet metal according to claim 1, wherein the grouping constraint condition is a material planning time.

6. The system for working sheet metal according to claim 1, wherein the grouping constraint condition is a priority of the work to be performed on the parts by at least one of the first cell and the second cell.

7. The system for working sheet metal according to claim 1, wherein the first cell comprises a punching cell to punch out the sheet metal.

8. The system for working sheet metal according to claim 1, wherein the first cell comprises a cutting cell to cut off the sheet metal.

9. The system for working sheet metal according to claim 8, wherein the cuffing cell cuts the sheet metal into material blanks.

10. The system for working sheet metal according to claim 1, wherein the second cell comprises a general purpose bending machine.

11. The system for working sheet metal according to claim 1, wherein the second cell comprises a bending machine that produces a panel.

12. The system for working sheet metal according to claim 1, further comprising a stocker to temporarily store semi-finished goods.

13. The system for working sheet metal according to claim 1, wherein a manual operation working can be performed in the working cells according to at least one of the determined working schedule for the second cell and the determined working schedule for the first cell.

* * * * *